United States Patent
Subramanya et al.

(10) Patent No.: US 9,104,451 B2
(45) Date of Patent: Aug. 11, 2015

(54) DYNAMIC COMMUNICATION BETWEEN SCRIPT AND EXECUTION LAYERS

(71) Applicant: ORACLE INTERNATIONAL CORPORATION, Redwood Shores, CA (US)

(72) Inventors: Ramya Subramanya, Bangalore (IN); Madhu Martin, Bangalore (IN); Stephen Mathew, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 283 days.

(21) Appl. No.: 13/685,360

(22) Filed: Nov. 26, 2012

(65) Prior Publication Data

US 2014/0149978 A1   May 29, 2014

(51) Int. Cl.
G06F 9/455       (2006.01)
G06F 9/44        (2006.01)

(52) U.S. Cl.
CPC .......... *G06F 9/45512* (2013.01); *G06F 9/4552* (2013.01)

(58) Field of Classification Search
None
See application file for complete search history.

(56) References Cited

U.S. PATENT DOCUMENTS

| | | | |
|---|---|---|---|
| 6,701,514 B1 * | 3/2004 | Haswell et al. | 717/115 |
| 7,490,316 B2 | 2/2009 | Chan et al. | |
| 7,624,373 B2 * | 11/2009 | Pandit et al. | 717/115 |
| 8,065,684 B2 | 11/2011 | Arts et al. | |
| 2005/0222990 A1 | 10/2005 | Milne | |
| 2005/0273861 A1 * | 12/2005 | Chess et al. | 726/25 |
| 2006/0036715 A1 | 2/2006 | Ghattu | |
| 2006/0168169 A1 | 7/2006 | Finan et al. | |

OTHER PUBLICATIONS

Oracle, The Java Tutorials, Nov. 17, 2011, Oracle, pp. 1-3, http://web.archive.org/web/20111117001110/http://docs.oracle.com/javase/tutorial/getStarted/intro/definition.html.*
Author Unknown, "Configuring servlet caching using wsadmin scripting," IBM, known to exist Apr. 26, 2012, 3 pages. Accessed at: http://publib.boulder.ibm.com/infocenter/wasinfo/fep/index.jsp?topic=%2Fcom.ibm.websphere.nd.multiplatform.doc%2Finfo%2Fae%2Fae%2Ftxml_caching.html.
Author Unknown, "Controlling Oracle WebLogic Tuxedo Connector Connections and Services," Oracle Corporation, known to exist Apr. 26, 2012, 5 pages. Accessed at: http://docs.oracle.com/cd/E12840_01/wls/docs103/wtc_admin/control.html.
Tillman, D,. "Use Jython to Exercise Java APIs Without Compiling," Internet.com, known to exist Apr. 26, 2012, 5 pages. Accessed at: http://www.devx.com/java/Article/27571/1954.

(Continued)

*Primary Examiner* — Lewis A Bullock, Jr.
*Assistant Examiner* — Bruce S Ashley
(74) *Attorney, Agent, or Firm* — Kilpatrick Townsend & Stockton LLP

(57) ABSTRACT

A method of dynamically communicating a parameter during runtime may include providing a script to a command-line scripting module that uses the parameter, where the parameter is to be provided during runtime by a user and the script is configured to generate an exception including an identifier associated with the parameter. The method may also include generating byte code based on the script, executing the byte code on a virtual machine until the exception is generated, passing the exception to the command-line scripting module, causing, by the command-line scripting module, receiving a parameter value from the user through an input device, passing the parameter value to the virtual machine, and continuing execution of the byte code on the virtual machine.

20 Claims, 7 Drawing Sheets

(56) References Cited

OTHER PUBLICATIONS

Lepech, S., "Using Jython to Automate WebSphere XD Dynamic Operations and Extended Manageability," IBM, Jul. 25, 2007, 11 pages. Accessed at: http://www.ibm.com/developerworks/websphere/library/techarticles/0707_lepech/0707_lepech.html.

Author Unknown, "Using the WebLogic Scripting Tool," Oracle Corporation, known to exist Apr. 26, 2012, 11 pages. Accessed at: http://docs.oracle.com/cd/E13222_01/wls/docs92/config_scripting/using_WLST.html.

* cited by examiner

DYNAMIC COMMUNICATION BETWEEN SCRIPT AND EXECUTION LAYERS

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Enterprise Software Systems can be used in particular cases to provide and govern access to data, web services, and other online applications using an access manager. An access manager can provide strong authentication-agnostic security to protect vital business assets. An access manager can also analyze authentication and transaction data for abnormalities and anomalies in real-time to prevent fraud. Some security related tasks may be executed periodically, and may include numerous subtasks. Therefore, in relation to an access manager, scripts may be developed by security administrators for use in performing repetitive and operation intensive tasks. One challenge in using scripts can relate to maintaining the security of information used in the scripts within the Enterprise Software System. Therefore, improvements are needed in the art.

BRIEF SUMMARY

In one embodiment, a method of dynamically communicating a parameter during runtime may be presented. The method may include providing a script to a command-line scripting module. The script may use the parameter, the parameter may be provided during runtime by a user, and the script may be configured to generate an exception associated with the parameter where the exception includes a parameter identifier. The method may also include generating byte code based on the script and executing the byte code on a virtual machine until the exception is generated. The virtual machine may operate on a Enterprise computer system. The method may additionally include passing the exception to the command-line scripting module and causing the parameter identifier to be communicated to the user using a display device. The command-line scripting module may cause the parameter identifier to be communicated to the user. The method may further include receiving a parameter value from the user through an input device, passing the parameter value to the virtual machine, and continuing execution of the byte code on the virtual machine.

In one embodiment, the script may include JYTHON code, and the byte code may include JAVA byte code. The byte code may be generated using a specialized compiler to recognize code segments requesting the parameter in the script. The command-line scripting module may operate on a first computer system, and the virtual machine may operate on a second computer system, where the first computer system may be geographically remote from the second computer system. The script may include initial parameters provided prior to runtime.

In another embodiment, the parameter may include a plurality of parameters, and the method may further include receiving parameter values for each of the plurality of parameters from the user through the input device. The plurality of parameters may each be associated with its own exception. Alternatively, each of the plurality of parameters may be associated with the same exception. A size of the plurality of parameters may be determined by at least one of the plurality of parameters at runtime.

In another embodiment, a computer-readable memory may be presented. The computer-readable memory may have stored thereon a sequence of instructions which, when executed by one or more processors, causes the one or more processors to dynamically communicate a parameter during runtime by providing a script to a command-line scripting module. The script may use the parameter, the parameter may be provided during runtime by a user, and the script may be configured to generate an exception associated with the parameter where the exception includes a parameter identifier. The instructions may also cause the processor(s) to generate byte code based on the script and executing the byte code on a virtual machine until the exception is generated. The virtual machine may operate on a Enterprise computer system. The instructions may also cause the processor(s) to pass the exception to the command-line scripting module and cause the parameter identifier to be communicated to the user using a display device. The command-line scripting module may cause the parameter identifier to be communicated to the user. The instructions may also cause the processor(s) to receive a parameter value from the user through an input device, pass the parameter value to the virtual machine, and continue execution of the byte code on the virtual machine.

In yet another embodiment, a system may be presented. The system may include one or more processors, and a memory communicatively coupled with and readable by the one or more processors and having stored therein a sequence of instructions which, when executed by the one or more processors, cause the one or more processors to dynamically communicate a parameter during runtime by providing a script to a command-line scripting module. The script may use the parameter, the parameter may be provided during runtime by a user, and the script may be configured to generate an exception associated with the parameter where the exception includes a parameter identifier. The instructions may also cause the processor(s) to generate byte code based on the script and executing the byte code on a virtual machine until the exception is generated. The virtual machine may operate on a Enterprise computer system. The instructions may also cause the processor(s) to pass the exception to the command-line scripting module and cause the parameter identifier to be communicated to the user using a display device. The command-line scripting module may cause the parameter identifier to be communicated to the user. The instructions may also cause the processor(s) to receive a parameter value from the user through an input device, pass the parameter value to the virtual machine, and continue execution of the byte code on the virtual machine.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a FIG. 1 illustrates a block diagram illustrating components of an exemplary operating environment in which various embodiments of the present invention may be implemented.

DETAILED DESCRIPTION

Figure 1:
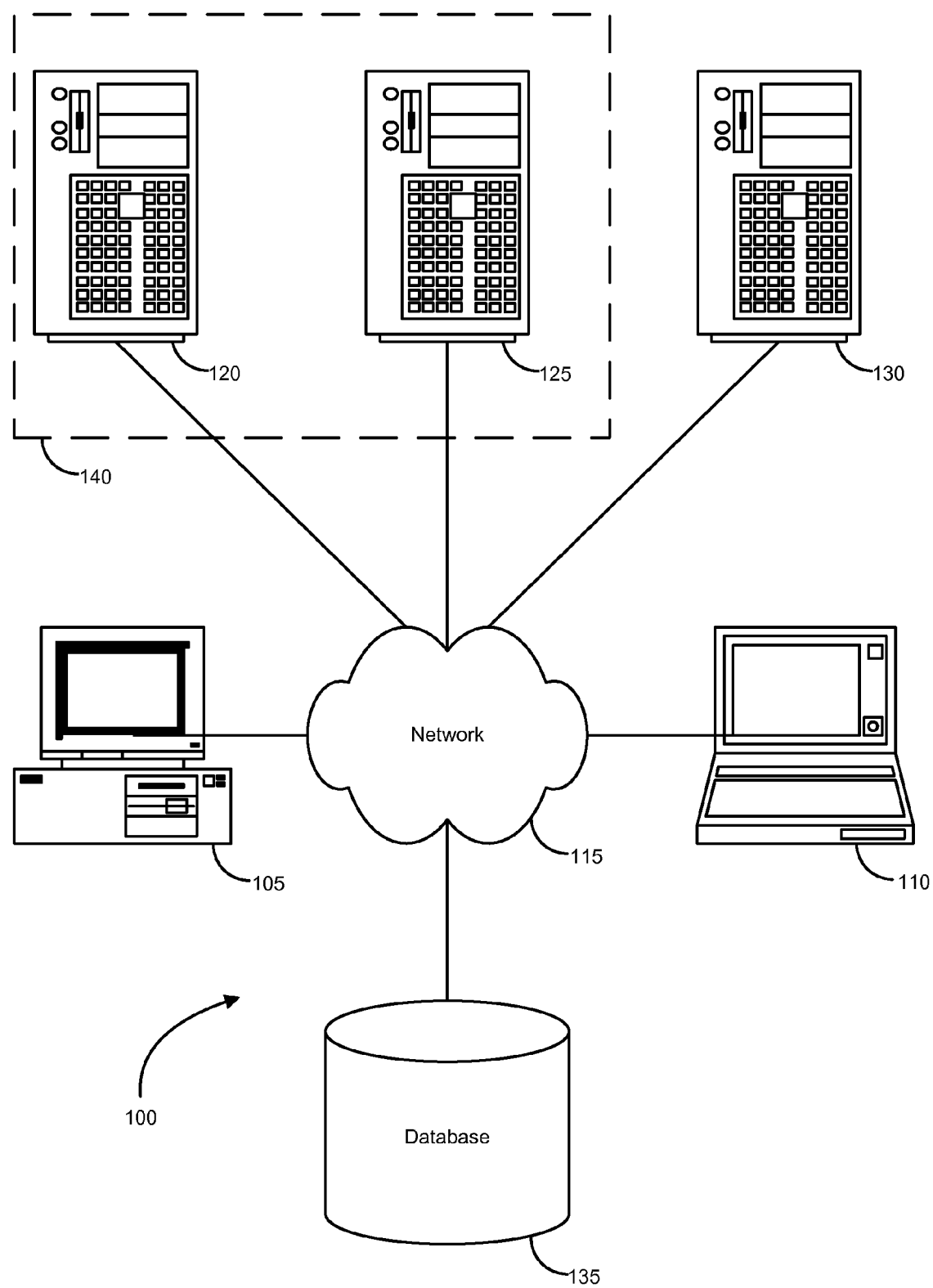

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for dynamically providing parameters from a command-line scripting module (CLSM) to an execution module. A protocol has been developed for communication between the CLSM and the execution module using exceptions. A script may include code configured to generate an exception on the execution module and to handle the exception at the CLSM using a user interface to retrieve additional parameters. The parameters may include a variable number of values, and may also include secure values such as passwords, passcodes, and/or PINs.

Command-line scripting environments can be used to manage and/or monitor server domains. The command-line scripting environments can also be used to perform various tasks, such as management of a server configuration, display of information, data input, data sorting and search, and/or the like. Users can provide command-line inputs to perform each of these various tasks.

In many cases, the tasks to be performed and the data to be analyzed can be very large and complex. These tasks may also be periodically performed. For example, a user may perform a complex and lengthy series of operations on the data set at the beginning of each month. Therefore, it would be an unwieldy and error-prone process to require users to enter each step of the tasks to be performed into a command line. In order to solve this problem, scripts can be used to aggregate a lengthy series of commands into a single file that can be reused multiple times in the future.

These operations may be very similar each time their performed, with only slight modifications. In some embodiments, these modifications can be dealt with using parameters that can be provided as inputs to a particular script. For example, a script analyzing financial transactions during a time interval may accept parameters such as a start date, an end date, transaction filters, and various financial accounts.

Certain situations arise, however, wherein parameters required by a script cannot be provided as initial parameters. These parameters may be required at runtime. As used herein, the term runtime may be used to refer to a time period during which a script is being executed by an execution module, i.e., the instructions embodied by the script are being executed by a processor. Therefore, runtime parameters may either be unknown prior to runtime, or may be restricted by security provisions of the software.

In one case, the parameters may not be known at runtime. For example, parameters may be based on preliminary results that are provided during the execution of the script. Values may be calculated and presented to a user interface. In response, the user may enter additional values to be used in subsequent calculations described in the remainder of the script. In another case, the parameters may include a variable number of values. Oftentimes, scripting languages require a predefined and static number of values used as initial parameters. For example, a process may require a list of account numbers. The list of account numbers may include a single account or an unlimited number of accounts as provided by the user. Because the number of accounts may be unknown when the script is written, or even prior to runtime, these cannot be provided as initial parameters to the script.

In another case, the parameters may be known prior to runtime, but they may be governed by security procedures and rules of an organization. These rules may prevent security parameters from being provided within a script, or even being provided as an initial parameter. Additionally, security parameters may need to be obtained after a connection is made to a secure sign-on service, federated identity management system, or other type of authentication module being used to provide access to data. For example, a script accessing a secure data set may require user credentials, such as a username or password, in order to access the secure data. The user credentials may need to be provided at runtime rather than stored in the script or entered as an initial parameter.

In order to solve these and other problems, certain embodiments described herein may use a communication protocol that takes advantage of exception handling and generation characteristics of both the scripting language of the command-line scripting environment and the execution module. These specially-designed execution code segments can provide a means for prompting a user for additional parameters identified by name, and then retrieving values for the identified parameters from the user at the command-line interface.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s WINDOWS ® and/or Apple Corp.'s MACINTOSH® operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, APPLETALK®, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the BLUETOOTH® protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
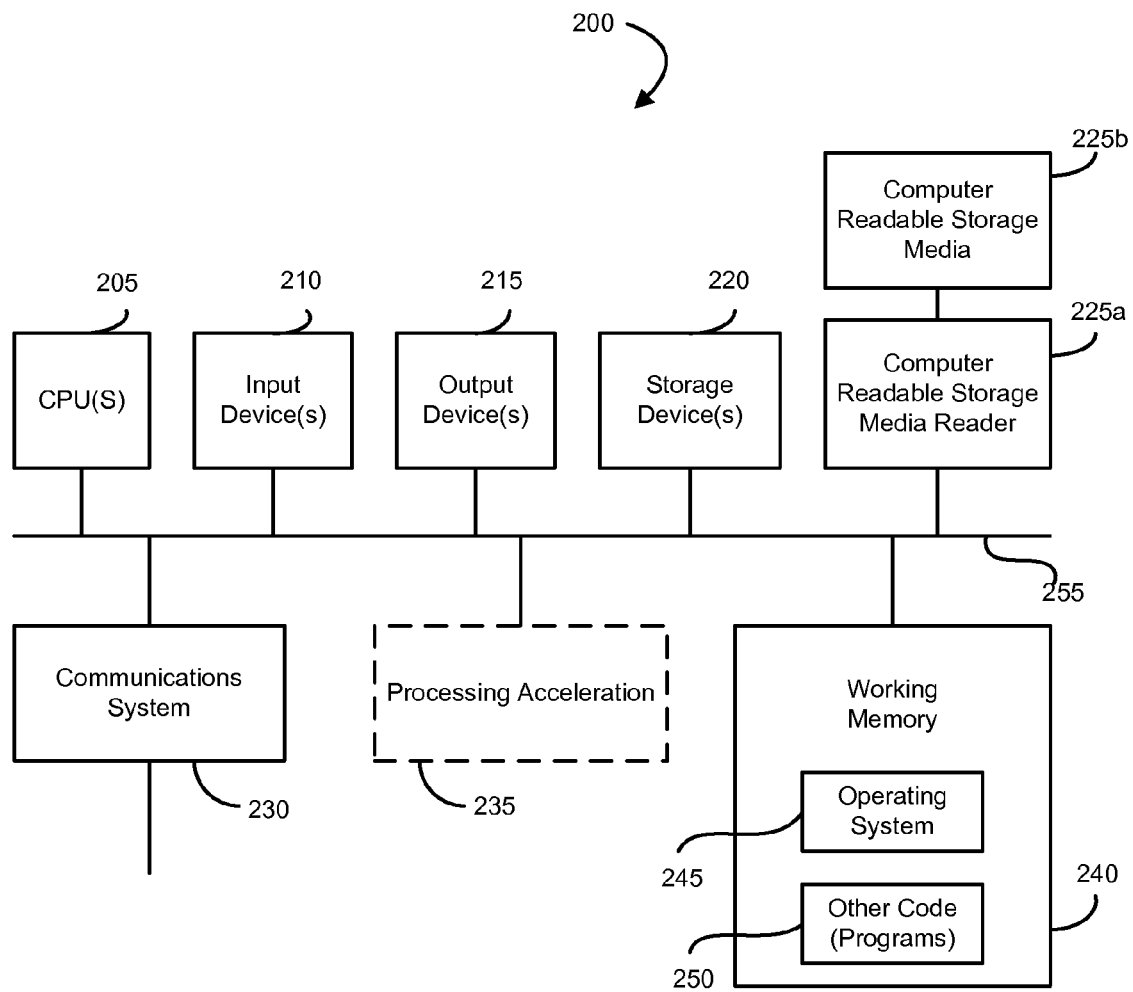
FIG. 2 illustrates a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a Web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 3:
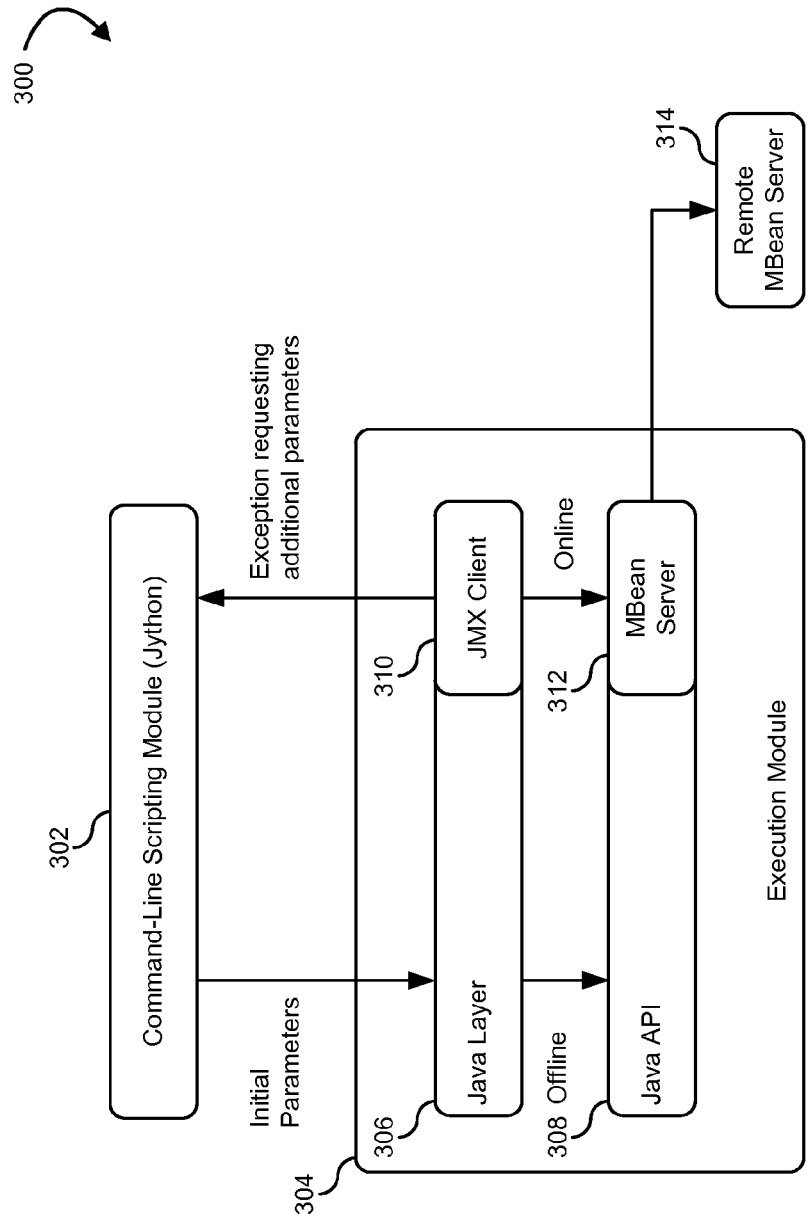
FIG. 3 illustrates a block diagram 300 of a specific system for executing scripts, according to one embodiment.

FIG. 3 illustrates a block diagram 300 of a specific system for executing scripts, according to one embodiment. This embodiment illustrates a specific type of system configuration that can be used to access data using a workstation. The Weblogic Scripting Tool (WLST) available from Oracle® is one example of a command-line scripting module 302 that can be used to monitor Weblogic Server domains. WLST commands for the Oracle Access Manager 11g product available from Oracle® can be used to perform various tasks, such as management of system configurations, display of information, etc. through command-line interfaces. This system can operate in both an online and an off-line mode.

This embodiment and other embodiments may use various scripting languages. In this particular example, the scripting language referred to as Jython may be used. Jython is a Java implementation of the popular Python scripting language. Most of the Python language features can be used in this implementation to write a script. The Jython script can then be compiled by the Jython compiler into Java byte code.

The command-line scripting module 302 can pass either the Jython script or the Java byte code to an execution module 304. In one embodiment, the command-line scripting module 302 may operate on a first computer system, while the execution module 304 may operate on a second computer system. In another embodiment, both the command-line scripting module 302 and the execution module 304 may operate on the same computer system. In another embodiment, the execution module 304 may operate on a server that is geographically remote from a workstation on which the command-line scripting module 302 operates. In this embodiment, the command-line scripting module 302 may be implemented using a web interface and a web browser.

When operating in an off-line mode, the Java byte code may interact with the Java layer 306 and the Java API 308 to execute the operations of the script. When operating in an online mode, a JMX client 310 may operate in conjunction with an MBean server 312 to also involve a remote MBean server 314.

The byte code executed by the execution module 304 may use various inputs that are collected from a user and communicated to the Java layer 306 from the Jython script. In one case, the user can pass these properties as parameters of the Jython script itself. Multiple inputs can be passed to the Java layer 306 by instead passing a location of a file as a parameter to the Jython script. The file may include additional parameters therein. When the Jython script is initially invoked with the initial parameters, these initial parameters can be passed to the Java layer 306. The Java layer 306 can then execute the relevant Java API 308 with the initial inputs sent to it by the Jython script. The execution of the Jython script will proceed if all the information required by the Java API 308 is already passed through the Jython script.

However, some types of parameters cannot be passed using either of these mechanisms. Additionally, the Java layer 306 may request additional inputs during runtime that would cause a traditional Jython script to fail. Prior to this disclosure, Jython scripts fail in cases such as these because they do not have the capability to request additional inputs during runtime. In order to change values that were used for each execution of the script, users had to edit the list of initial parameters (or a referenced file) and rerun the Jython script each time the Java layer 306 required extra inputs.

In one embodiment, this and other problems may be solved by establishing a protocol between the Jython script and the underlying Java layer 306. This communication protocol may enable the Java layer 306 to communicate additional inputs that may be required during runtime to a user. In one embodiment, this communication protocol is facilitated using exceptions. As used herein, the term "exceptions" may be used to refer to an anomalous or exceptional situation requiring special processing, often changing the normal flow of program execution. Exceptions may be handled using specialized programming language constructs or specialized computer hardware mechanisms.

The Java layer 306 may generate exceptions as additional parameters are needed during the execution of the script. For example, the Java API 308 can throw a pre-defined exception to the Jython script. The exception can be passed back to the command-line scripting module 302, and the Jython script can process the exception to allow a user to provide additional input(s) so that the Java layer 306 can proceed with the execution. This solution not only accommodates requests for additional inputs, but it also enables a user to provide secure inputs that comply with an Enterprise's security rules for password protection.

In one embodiment, the exception thrown by the Java API 308 can include an identifier of the parameter that is required by the Java API 308 to proceed with the execution. The Jython script can process this exception, presenting the identifier to the command-line scripting module for the user. In another embodiment, the identifier may be used by the Jython script to look up a property name and description from a database, configuration file, or other data store. At this point, the user may be prompted to enter a value for this property, and the Jython script may then receive an input from the user. After receiving the value, the Java API 308 can then again be invoked by the Jython script. In cases where multiple parameters are required during runtime, this process can be repeated until the Java API 308 finishes execution without throwing additional exceptions requiring additional user input.

Figure 4:
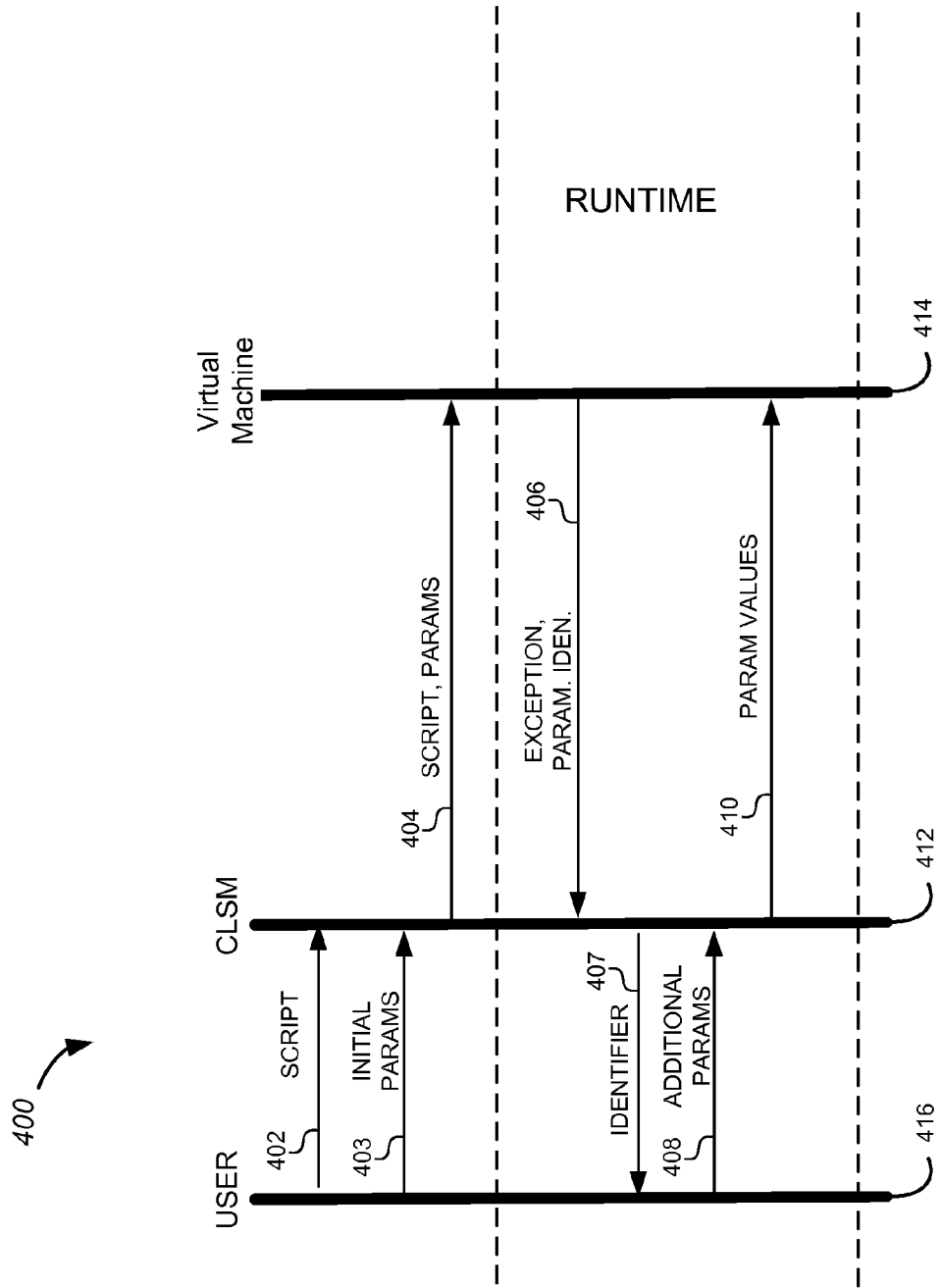
FIG. 4 illustrates a flow diagram 400 of code and data that are passed between different modules, according to one embodiment.

FIG. 4 illustrates a flow diagram 400 of code and data that are passed between different modules, according to one embodiment. It will be understood that flow diagram 400 is merely exemplary, and that other information may be passed between the various entities that is not explicitly shown. It will also be understood that the order, senders, and recipients may also change according to various embodiments.

In this embodiment, a user 416 may supply a script to a command-line scripting module (CLSM) 412 (402). In another embodiment, the script may be provided by an automated software process, such as a scheduling process that performs operations on data sets at regular intervals. In another embodiment, the script may be provided by an external computer system in response to an event, such as detection of fraud, data changes, or user activity. The script may also be supplied by manual entry at a command-line prompt.

The CLSM 412 can also receive a set of initial parameters from the user 416 (403). Some scripts may not require initial parameters, while other scripts may optionally allow for initial parameters. The initial parameters can be provided by manual entry as arguments to a script command using a command-line prompt. The initial parameters may also be automatically acquired from a database, file, or another type of data store. The initial parameters may also be supplied by an automated software process that automatically extracts or calculates data required by the script.

The script, along with any initial parameters, may then be sent from the CLSM 412 to a virtual machine 414 (404). In one embodiment, a script compiler may first translate the script and initial parameters to byte code that can be run on the virtual machine 414. In some embodiments, this may also involve a language translation mechanism. For example, when a Jython script is used, a Jython compiler may take the Python-based script and translate it into Java byte code to run on a Java virtual machine. In some embodiments, the transition to byte code may take place on a computer system running the CLSM 412. In other embodiments, the transition to byte code may take place on a computer system running the virtual machine 414.

The virtual machine 414 may then begin executing the byte code based on the script and the initial parameters. When the virtual machine 414 encounters an exception that is specifically designed to communicate with the CLSM 412, the virtual machine 414 may pass the exception to the CLSM 412. The exception may include a parameter identifier (406). In some embodiments, the parameter identifier may be a name of the parameter, while in others, the parameter identifier may be a location, a URL, the memory address, and/or the like.

The CLSM 412 may receive the exception, including the parameter identifier, and present a message to the user 416 (407). The message may be a textual or graphical representation of the parameter identifier such that the user can readily determine the type of value needed to continue correct execution of the script. For example, the message to the user 416 could recite "please enter a start date," or "please enter your password." In other embodiments, the message to the user can include graphical controls, such as drop-down boxes, radio buttons, and other types of selection interfaces that are populated with data. The populating data may be included as part of the exception, or may be acquired from an additional data source.

In response, the user 416 may provide additional parameter values to the CLSM 412 (408). These additional values may then be transferred back to the virtual machine 414 (410), and the virtual machine 414 can continue execution of the byte code. Note that in another embodiment (not shown) multiple parameter values may be requested by the virtual machine 414. A single exception may be generated that includes identifiers for one or more additional parameters as shown in FIG. 4. Alternatively, each requested parameter may be associated with its own exception. Thus, the sequence shown in FIG. 4 during runtime may be repeated for each parameter value associated with an exception.

Figure 5:
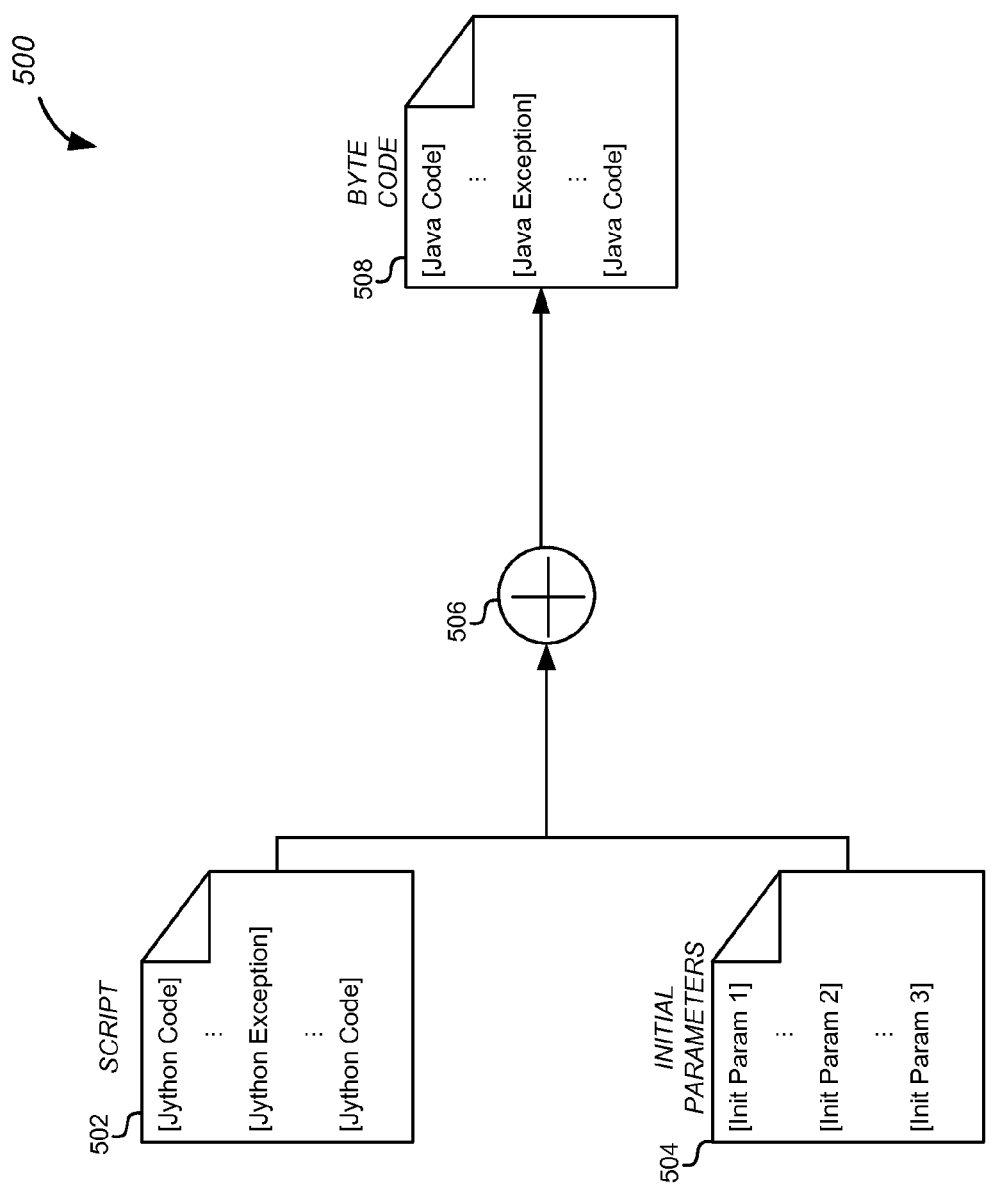
FIG. 5 illustrates a data flow diagram 500 of exemplary code transformations that may take place, according to one embodiment.

FIG. 5 illustrates a data flow diagram 500 of exemplary code transformations that may take place, according to one embodiment. Again, it should be noted that the particular embodiment illustrated in FIG. 5 includes a Jython script being transformed into Java byte code. These programming languages are merely exemplary, and it will be understood that any other scripting and/or interpreted languages could be used in their place.

A script 502 may be prepared prior to runtime. The script 502 may be designed to be executed numerous times using different initial parameters for each execution. Here, the initial parameters 504 are provided as part of a file, such as a configuration file that may be referenced by an argument to script 502 when it is executed. The initial parameters may also be provided manually.

The script 502 may include multiple lines of code, including one or more blocks of code defining exception-handling procedures. One example of the exception handling procedure is given by the following code segment using the Jython/Python programming language:

```
while x != "done":
    try:
        mig= WLSTWrapper.execute(m)
        x = "done"
        print mig
    except IOException,ioe:
        e = sys.exc_info( ) [1]
        if e.getMessage( ) .startswith("Property Value NULL for :") :
            message = e.getMessage( )
            arg = message[message.find(":")+1:len(message)]
            MaskingThread = MaskingPassword( )
            MaskingThread.start( )
            argval = raw_input("Enter value for property : "+arg+" : ")
            MaskingThread.stop( )
            missingprop = arg+":"+argval+";"+missingprop
            m.put("oamMigrateProperty",missingprop)
```

In this exemplary code segment, the script attempts to execute at least a portion of the main script code. If at some point an IOException is thrown, the "except" block can catch the exception. This block can first identify the parameter identifier ("arg") from the exception message and then present a request to the user, such as "Enter value for property [arg]." This block can then receive the argument value for the parameter and insert that value into a property object to be passed back to the virtual machine.

A special script compiler 506 may be used to translate the script and parameter combination into byte code that can operate on the virtual machine and properly deal with these types of exceptions. The script compiler 506 may be configured to recognize the communication protocol for dynamically passing parameters between the command-line script module and the virtual machine. The output of the script compiler 506 can include byte code 508 that includes multiple lines of Java byte code including a block of Java code that throws an exception when a required parameter is discovered to be missing. For example, the script compiler 506 may recognize the code example given above as handling a missing parameter. In the corresponding byte code 508, the following exemplary code segment may be added:

```
catch (IOException ioe)
{
    if(ioe.getMessage( ) .startsWith("Property Value NULL for"))
        throw ioe;
}
```

The script compiler 506 can be configured to automatically place any code that would require dynamically acquired parameters to be placed in a catch-try block of code. In response to discovering a missing parameter, the virtual machine can be instructed to throw an exception that is passed to the command-line scripting module to be handled as described above.

Figure 6:
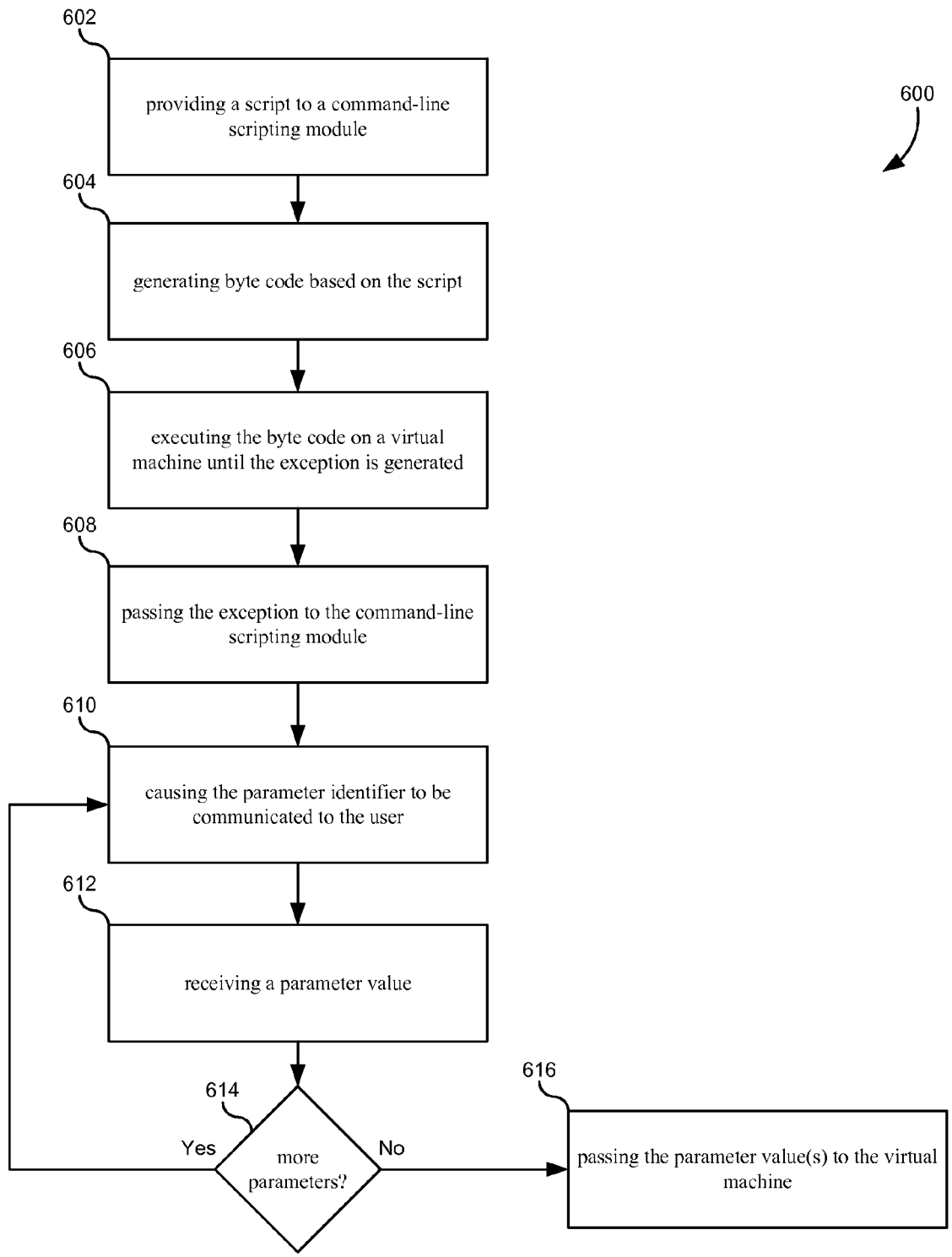
FIG. 6 illustrates a flowchart 600 of a method for dynamically providing parameter values during runtime, according to one embodiment.

FIG. 6 illustrates a flowchart 600 of a method for dynamically providing parameter values during runtime, according to one embodiment. This method may be executed using any of the computer system hardware and/or software that is described in this disclosure. The method may include providing a script to a command-line scripting module (602). In one embodiment, the script may require a value for the parameter to be dynamically provided. The parameter may be dynamically provided during runtime by a user, or by another software process. In one embodiment, the script may be configured to generate an exception associated with the parameter. The exception may include a parameter identifier that can be used to identify the nature of the parameter requested to a user.

The method may also include generating byte code based on the script (604). In one embodiment, the byte code may be generated by a command-line scripting module. In another embodiment, the byte code may be generated by a computer system running a virtual machine. In yet another embodiment, the byte code may be generated using a script compiler that is specifically configured to recognize characteristic blocks of code in the script that handle runtime parameters. The script compiler can automatically generate byte code that "throws" an exception when missing parameters are encountered.

The method may additionally include executing the byte code on a virtual machine until the exception is generated (606). In one embodiment, the byte code comprises Java byte code, and the virtual machine comprises a Java virtual machine (JVM). Byte code that may encounter a missing parameter may be enclosed within a try-catch block configured to catch an IOException that includes an identifier for the missing parameter. In one embodiment, the virtual machine operates on an Enterprise computer system as a part of an Enterprise Software System.

The method may further include passing the exception to the command-line scripting module (608). The command-line scripting module may execute the original script that was designed to handle an exception thrown by the virtual machine and request the missing parameter from the user. In one embodiment, the command-line scripting module may be specially configured to continue running the original script while the byte code is also being executed on the virtual machine.

The method may also include causing the parameter identifier to be communicated to the user (610). The parameter identifier may be included as a field in the exception object. The parameter identifier may also be parsed from a text string embodied by a message within the exception object. In different programming languages, the parameter identifier may also be a parameter provided with the exception object. The parameter identifier may comprise a text string, a URL, a file location, a memory location, a description, a graphical representation, and/or the like. In one embodiment, the parameter identifier may be configured to communicate the identity of the missing parameter to a user. The parameter identifier may be communicated using a command-line prompt, a graphical interface on a display device of the computer system running the command-line scripting module, a sound output, and/or the like. In another embodiment, the parameter identifier may be communicated to another software process instead of to user.

The method may additionally include receiving a parameter value (612). In one embodiment, a user may provide a parameter value associated with the parameter identifier at a command line. In another embodiment, the user may select a file, a URL, or another type of locator that will provide the parameter value. In yet another embodiment, the parameter value may be provided by another software process instead of a user.

The method may optionally include determining whether more than one parameter is being requested by the virtual machine (614). If more parameters are being requested by the currently-thrown exception, the method may repeat the process of presenting parameter identifiers and receiving parameter values until all the parameters are received. In one embodiment, the IOException thrown by the Java byte code may include multiple messages indicating multiple parameter identifiers to be retrieved from the user. When all the requested parameter values have been acquired, the method may also include passing the parameter values back to the virtual machine (616). At this point, the virtual machine may continue executing the byte code following the exception-throwing code in the normal fashion.

In another embodiment (not shown), multiple parameters may be handled by individual exceptions. In other words, each missing parameter may throw a separate exception, or type of exception, at the virtual machine. In this case, flowchart 600 may be altered such that the loop begins at step 606 instead of step 610.

It should be appreciated that the specific steps illustrated in FIG. 6 provide particular methods of dynamically providing runtime parameters according to various embodiments of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
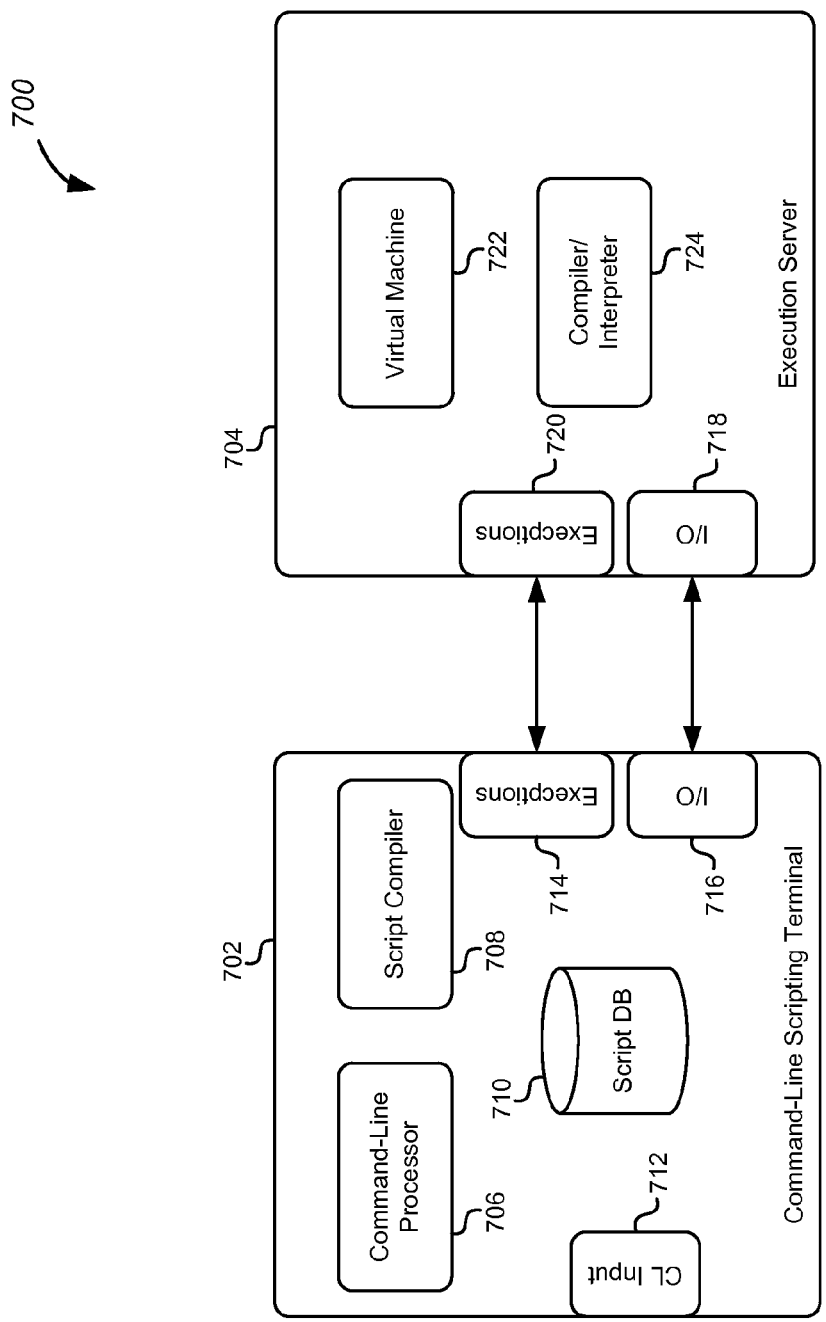
FIG. 7 illustrates a block diagram 700 of a hardware system for dynamically providing parameter values during runtime, according to one embodiment.

FIG. 7 illustrates a block diagram 700 of a hardware system for dynamically providing parameter values during runtime, according to one embodiment. In some embodiments, the systems and methods described in this disclosure may be implemented using general-purpose computer systems, such as computer system 200 illustrated in FIG. 2. However, in other embodiments, the systems and methods described in this disclosure may be implemented using a specifically designed hardware system. Such a hardware system can be readily constructed by one having skill in the art using the hardware and software disclosed herein in relation to FIG. 1 and FIG. 2. Any arrangement of such hardware functions is depicted generally by a block diagram 700.

The system may include a command-line scripting terminal 702 implemented using computer input and output devices, a processor, one or more memories, and one or more I/O ports for communication between computer systems. A command-line processor 706 may be configured to receive script commands and data inputs from user. A script compiler 708 may be configured to translate commands and scripts into byte code for execution on a virtual machine. Note that the script compiler 708 may alternatively be located elsewhere in block diagram 700.

The command-line scripting terminal 702 may also include a script database 710 that is implemented using one or more memory devices. The script database 710 may be configured to store one or more scripts that are executed multiple times on a data set. A number of I/O subsystems may also be included. For example, a command-line input 712 may be provided to receive textual inputs from a user using a number of different possible types of input devices. One or more communication ports may also be used to communicate with another computer system. For example, an I/O port 716 may be used to send the script and/or byte code to the virtual machine. Additionally, an exception port 714 may be used to communicate during runtime with a virtual machine.

The system may also include a second computer system referred to as an execution server 704. The execution server 704 may include a virtual machine configured to execute the byte code generated by the script compiler 708. Various other types of compilers and/or interpreters 724 may also be implemented on the execution server 704. The execution server 704 may also include various I/O subsystems to communicate with the command-line scripting terminal 702, such as an exception port 720 and an I/O port 718.

In one embodiment, the execution server 704 and the command-line scripting terminal 702 may both be implemented on the same computer hardware, and/or may be co-located in the same facility. In another embodiment, the command-line scripting terminal 702 may be located more than 2 miles away from the execution server 704, or may be otherwise geographically remotely located from the execution server 704. In a further embodiment, the command-line scripting terminal 702 may be implemented using a personal computer, a tablet computer, a workstation, a smart phone, and/or other type of personal computing device. The command-line input 712 may be implemented in a specialized software application or as a routine running within a web browser.

In one embodiment, the various modules and systems in FIG. 7 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of dynamically communicating a parameter during runtime between a command-line scripting module and a virtual machine, the method comprising:
providing a script to a command-line scripting module, wherein:
the script executes a function that requires the parameter; and
the script does not provide the parameter to the function;
generating byte code for the function, wherein try-catch code is automatically inserted around code that uses the parameter in the function;
executing the byte code on a virtual machine until an exception is generated because the parameter was not provided to the function, wherein the function is unable to request the parameter as a user input during runtime;
passing the exception from the virtual machine to the command-line scripting module;
extracting a parameter identifier from the exception at the command-line scripting module;
generating output using the parameter identifier at the command-line scripting module, wherein the output requests the parameter;

receiving input at the command-line scripting module that includes the parameter;

re-executing the byte code with the parameter.

2. The method of claim 1 wherein the script comprises JYTHON code, and wherein the byte code comprises JAVA byte code.

3. The method of claim 1 wherein the byte code is generated using a specialized compiler to recognize code segments requesting the parameter in the script.

4. The method of claim 1 wherein the command-line scripting module operates on a first computer system, and wherein the virtual machine operates on a second computer system, wherein the first computer system is geographically remote from the second computer system.

5. The method of claim 1 wherein the parameter comprises a password.

6. The method of claim 1 wherein the script comprises initial parameters provided prior to runtime.

7. The method of claim 1 wherein the parameter comprises a plurality of parameters, and wherein the method further comprises looping through exceptions generated by the byte code until each of the plurality of parameters has been provided.

8. The method of claim 7 wherein each of the plurality of parameters is associated with its own exception.

9. The method of claim 7 wherein each of the plurality of parameters is associated with the same exception.

10. The method of claim 7 wherein a size of the plurality of parameters is determined by at least one of the plurality of parameters at runtime.

11. A non-transitory computer-readable memory comprising instructions that, when executed by one or more processors, cause the one or more processors to perform operations comprising:

providing a script to a command-line scripting module, wherein:

the script executes a function that requires the parameter; and the script does not provide the parameter to the function;

generating byte code for the function, wherein try-catch code is automatically inserted around code that uses the parameter in the function;

executing the byte code on a virtual machine until an exception is generated because the parameter was not provided to the function, wherein the function is unable to request the parameter as a user input during runtime;

passing the exception from the virtual machine to the command-line scripting module;

extracting a parameter identifier from the exception at the command-line scripting module;

generating output using the parameter identifier at the command-line scripting module, wherein the output requests the parameter;

receiving input at the command-line scripting module that includes the parameter;

re-executing the byte code with the parameter.

12. The non-transitory computer-readable memory according to claim 11 wherein the script comprises JYTHON code, and wherein the byte code comprises JAVA byte code.

13. The non-transitory computer-readable memory according to claim 11 wherein the byte code is generated using a specialized compiler to recognize code segments requesting the parameter in the script.

14. The non-transitory computer-readable memory according to claim 11 wherein the parameter comprises a password.

15. The non-transitory computer-readable memory according to claim 11 wherein the parameter comprises a plurality of parameters, and wherein the instructions cause the one or more processors to perform further operations comprising looping through exceptions generated by the byte code until each of the plurality of parameters has been provided.

16. The non-transitory computer-readable memory according to claim 15 wherein each of the plurality of parameters is associated with its own exception.

17. The non-transitory computer-readable memory according to claim 15 wherein each of the plurality of parameters is associated with the same exception.

18. A system comprising:

one or more processors; and a memory communicatively coupled with and readable by the one or more processors and comprising instructions that, when executed by the one or more processors, cause the one or more processors to perform operations comprising:

providing a script to a command-line scripting module, wherein:

the script executes a function that requires the parameter; and the script does not provide the parameter to the function;

generating byte code for the function, wherein try-catch code is automatically inserted around code that uses the parameter in the function;

executing the byte code on a virtual machine until an exception is generated because the parameter was not provided to the function, wherein the function is unable to request the parameter as a user input during runtime;

passing the exception from the virtual machine to the command-line scripting module;

extracting a parameter identifier from the exception at the command-line scripting module;

generating output using the parameter identifier at the command-line scripting module, wherein the output requests the parameter;

receiving input at the command-line scripting module that includes the parameter;

re-executing the byte code with the parameter.

19. The system of claim 18 wherein the script comprises JYTHON code, and wherein the byte code comprises JAVA byte code.

20. The system of claim 18 wherein the byte code is generated using a specialized compiler to recognize code segments requesting the parameter in the script.

* * * * *

UNITED STATES PATENT AND TRADEMARK OFFICE
CERTIFICATE OF CORRECTION

| | | |
|---|---|---|
| PATENT NO. | : 9,104,451 B2 | Page 1 of 1 |
| APPLICATION NO. | : 13/685360 | |
| DATED | : August 11, 2015 | |
| INVENTOR(S) | : Subramanya et al. | |

It is certified that error appears in the above-identified patent and that said Letters Patent is hereby corrected as shown below:

In drawings,

On sheet 7 of 7, in figure 7, under Reference Numeral 714, line 1, delete "Execptions" and insert -- Exceptions --, therefor.

On sheet 7 of 7, in figure 7, under Reference Numeral 720, line 1, delete "Execptions" and insert -- Exceptions --, therefor.

Signed and Sealed this
Fifteenth Day of March, 2016

Michelle K. Lee
*Director of the United States Patent and Trademark Office*